United States Patent
Kato et al.

(10) Patent No.: US 10,543,961 B2
(45) Date of Patent: Jan. 28, 2020

(54) CONTAINER CAP AND PRODUCTION METHOD FOR CONTAINER CAP

(71) Applicant: Mitsubishi Gas Chemical Company, Inc., Tokyo (JP)

(72) Inventors: Tomonori Kato, Kanagawa (JP); Kenji Kouno, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 16/340,990

(22) PCT Filed: Sep. 8, 2017

(86) PCT No.: PCT/JP2017/032521
§ 371 (c)(1),
(2) Date: Apr. 10, 2019

(87) PCT Pub. No.: WO2018/070157
PCT Pub. Date: Apr. 19, 2018

(65) Prior Publication Data
US 2019/0256256 A1    Aug. 22, 2019

(30) Foreign Application Priority Data

Oct. 13, 2016   (JP) ................................. 2016-202082

(51) Int. Cl.
*B65D 41/04* (2006.01)
*B29C 45/00* (2006.01)
(Continued)

(52) U.S. Cl.
CPC .......... *B65D 41/04* (2013.01); *B29C 45/0001* (2013.01); *B29C 45/27* (2013.01);
(Continued)

(58) Field of Classification Search
CPC ..... B65D 41/04; B29C 45/0001; B29C 45/27; C08L 53/00; C08L 23/12;
(Continued)

(56) References Cited

U.S. PATENT DOCUMENTS

2016/0052678 A1    2/2016    Hanafusa et al.

FOREIGN PATENT DOCUMENTS

| EP | 2479116 A1 | 7/2012 |
|---|---|---|
| JP | 2005-335765 A | 12/2005 |

(Continued)

OTHER PUBLICATIONS

International Search Report for PCT/JP2017/032521, dated Nov. 28, 2017, and English Translation submitted herewith (6 pages).

*Primary Examiner* — Michael C Miggins
(74) *Attorney, Agent, or Firm* — Fitch, Even, Tabin & Flannery LLP

(57) ABSTRACT

A container cap is a container cap including a molded article formed of a resin composition containing 70 to 94% by mass of a polyolefin (A), 3 to 15% by mass of an acid-modified polyolefin (B) and 3 to 15% by mass of a m-xylylene group-containing polyamide (C), in which a ratio (X/Y) of a percentage (X) of polyamide-derived nitrogen in a cap top surface portion to a percentage (Y) of polyamide-derived nitrogen in a cap side surface portion, is 1.2 to 3.0, as measured by a total nitrogen analysis.

11 Claims, 2 Drawing Sheets

(51) Int. Cl.
  *B29C 45/27* (2006.01)
  *C08L 53/00* (2006.01)
  *C08L 23/12* (2006.01)
  *B29K 23/00* (2006.01)
  *B29L 31/56* (2006.01)

(52) U.S. Cl.
  CPC ............... *C08L 23/12* (2013.01); *C08L 53/00* (2013.01); *B29K 2023/12* (2013.01); *B29L 2031/565* (2013.01); *C08L 2205/025* (2013.01); *C08L 2205/03* (2013.01)

(58) Field of Classification Search
  CPC ........... C08L 2205/025; C08L 2205/03; B29K 2023/12; B29L 2031/565
  See application file for complete search history.

(56) References Cited

FOREIGN PATENT DOCUMENTS

| | | |
|---|---|---|
| JP | 2014-037248 A | 2/2014 |
| JP | 2015-063317 A | 4/2015 |
| WO | 2008/062811 A1 | 5/2008 |
| WO | 2014/103054 A1 | 7/2014 |

# CONTAINER CAP AND PRODUCTION METHOD FOR CONTAINER CAP

CROSS-REFERENCE TO RELATED APPLICATIONS

This application is a U.S. national phase application filed under 35 U.S.C. § 371 of International Application Number PCT/JP2017/032521, filed Sep. 8, 2017, designating the United States, which claims priority from Japanese Application Number 2016-202082, filed Oct. 13, 2016.

FIELD OF THE INVENTION

The present invention relates to a container cap, and more particularly, to a container cap in which a m-xylylene group-containing polyamide is dispersed as a gas barrier resin in polyolefin, and a method for producing the same.

BACKGROUND OF THE INVENTION

A gas barrier property is imparted to containers used in foods, industrial products, and the like in many cases in order to prevent deterioration of contents due to incorporation of gas such as oxygen from the outside and to prevent volatilization of active ingredients and the like from the contents. In order to impart the gas barrier property to a container main body, when the container is made of a resin, it is known to provide a multi-layer structure by forming a layer made of a gas barrier material such as a gas barrier resin or an aluminum foil. In addition, it is also known to impart the gas barrier property by dispersing a gas barrier resin in a layered form in polyolefin or the like which is a main component of a resin container. Furthermore, when a high gas barrier property is required, containers made of glass are used in some cases.

Meanwhile, a cap for closing the mouth portion of the container has a small surface area, so that the gas barrier property is not imparted in many cases. However, since a high gas barrier property has been recently required for a container in some cases, it has been studied to impart a gas barrier property to a cap as well. For example, PTL 1 discloses a container cap in which a m-xylylene group-containing polyamide as a gas barrier resin is dispersed in a layered form in a polyolefin as a main component of a resin cap.

CITATION LIST

Patent Literature

PTL 1: JP 2014-37248 A

SUMMARY OF INVENTION

However, as disclosed in PTL 1, when a gas barrier resin is dispersed in a layered form in a resin cap, the gas barrier resin is typically dispersed not only on the top surface of the cap but also on the side surface of the cap. A polyamide constituting the gas barrier resin, particularly a m-xylylene group-containing polyamide having a high gas barrier property has high hardness, and thus has low adhesiveness to polyolefin. Consequently, when the cap is fastened to hermetically seal the container, cracks may occur on the cap side surface due to peeling of the m-xylylene group-containing polyamide, which is a gas barrier resin, from the polyolefin, thereby causing sealing failure in some cases.

The present invention has been made in consideration of the above-mentioned problems, and an object of the present invention is to improve a gas barrier property of a cap and to prevent cracks from occurring on the side surface of the cap due to peeling of a gas barrier resin from a polyolefin at the time of fastening the cap.

The present inventors have assiduously studied and, as a result, have found that the problem can be solved by molding a container cap with a resin composition containing a polyolefin, an acid-modified polyolefin, and a m-xylylene group-containing polyamide at a predetermined blending ratio, and unevenly distributing the m-xylylene group-containing polyamide on the top surface of the cap to reduce the polyamide content rate on the side surface of the cap, and have completed the present invention to be described below. Specifically, the present invention provides the following (1) to (11).

(1) A container cap including a molded article formed of a resin composition containing 70 to 94% by mass of a polyolefin (A), 3 to 15% by mass of an acid-modified polyolefin (B) and 3 to 15% by mass of a m-xylylene group-containing polyamide (C),
wherein a ratio (X/Y) of a percentage (X) of polyamide-derived nitrogen in a cap top surface portion to a percentage (Y) of polyamide-derived nitrogen in a cap side surface portion, is from 1.2 to 3.0, as measured by a total nitrogen analysis.
(2) The container cap according to the above (1), in which the m-xylylene group-containing polyamide (C) contains a diamine unit containing 70 mol % or more of a structural unit derived from m-xylylenediamine, and a dicarboxylic acid unit containing 70 mol % or more of a structural unit derived from a dicarboxylic acid selected from the group consisting of α,ω-linear aliphatic dicarboxylic acid having 4 to 20 carbon atoms and isophthalic acid and having a molar ratio of a structural unit derived from the α,ω-linear aliphatic dicarboxylic acid having 4 to 20 carbon atoms to a structural unit derived from isophthalic acid of 30:70 to 100:0.
(3) The container cap according to the above (1) or (2), wherein an acid value of the acid-modified polyolefin (B) is more than 15 mgKOH/g and 30 mgKOH/g or less.
(4) The container cap according to any one of the above (1) to (3), wherein a terminal amino group concentration of the m-xylylene group-containing polyamide (C) is from 10 to 100µ equivalent/g.
(5) The container cap according to any one of the above (1) to (4), wherein the polyolefin (A) is a polypropylene resin.
(6) The container cap according to any one of the above (1) to (5), wherein the m-xylylene group-containing polyamide (C) is dispersed in a layered form in a cap top surface portion.
(7) The container cap according to any one of the above (1) to (6), wherein the molded article is an injection-molded article.
(8) A method for producing the container cap according to any one of the above (1) to (7), including subjecting the resin composition to injection molding to thereby obtain the molded article.
(9) The method for producing the container cap according to the above (8), wherein the resin composition is injected from a cap top surface portion side through a one-point gate.
(10) The method for producing the container cap according to the above (9), wherein the one-point gate has a gate diameter of 0.5 to 1.2 mm.

(11) The method for producing the container cap according to any one of the above (8) to (10), wherein a resin temperature at a nozzle tip of an injection molding machine performing the injection molding falls within a range of −5° C. to +15° C. with respect to a melting point of the m-xylylene group-containing polyamide (C), as measured by DSC.

In the present invention, it is possible to improve a gas barrier property of a cap and to prevent cracks from occurring on the side surface of the cap by peeling a gas barrier resin from a polyolefin at the time of fastening the cap.

DESCRIPTION OF EMBODIMENTS

Figure 1:
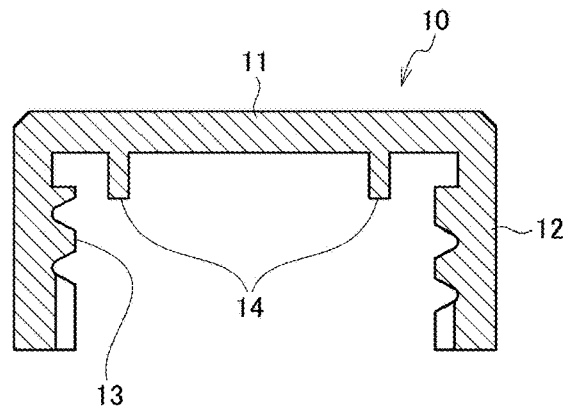
FIG. 1 is a schematic cross-sectional view illustrating an example of a container cap.

Hereinafter, embodiments of the present invention will be described by using embodiments.

A container cap according to the present invention includes a molded article formed of a resin composition containing a polyolefin (A), an acid-modified polyolefin (B), and a m-xylylene group-containing polyamide (C) (hereinafter, simply referred to as "polyamide (C)" in some cases). Hereinafter, these components (A) to (C) will be described in detail.

(Polyolefin (A))

As the polyolefin (A), various ones can be mentioned, and any polyolefin can be used without limitation as long as the polyolefin can be used for an injection-molded article. As the specific polyolefin (A), a polyethylene resin such as low-density polyethylene, medium-density polyethylene, high-density polyethylene, and linear low-density polyethylene; and a polypropylene resin such as homopolypropylene, block polypropylene, and propylene-ethylene random copolymer are used. The block polypropylene is obtained, for example, by polymerizing propylene with another olefin such as ethylene in multiple stages. Further, examples of the block polypropylene include a propylene-ethylene block copolymer, or a sea-island structure in which polyethylene is dispersed in homopolypropylene and an ethylene propylene rubber (EPR) phase is present around the polyethylene.

Further, in addition to the above-mentioned polyethylene resin and polypropylene resin, homopolymers of α-olefins having 4 to 20 carbon atoms such as 1-butene and 1-methylpentene, copolymers of α-olefins having 3 to 20 carbon atoms, copolymers of an α-olefin having 3 to 20 carbon atoms and a cyclic olefin, and the like are also exemplified. Furthermore, the polyolefin (A) is an unmodified polyolefin, that is, a polyolefin which is not modified by an acid.

As the polyolefin (A), among the above-mentioned polyolefins, a polyethylene resin and a polypropylene resin are preferred, and a polypropylene resin is more preferred from the viewpoint of formability and flexibility of a blend composition. Further, as the polypropylene resin, homopolypropylene and block polypropylene are preferred, but block polypropylene is more preferred from the viewpoint of more effectively preventing cracks on the side of the cap.

As an index for the melt viscosity and the molecular weight of a polyolefin, a melt flow rate (MFR) may be typically used. It is preferred that the melt flow rate (MFR) of the polyolefin (A), for example, at 190° C. under a load of 21.18 N (2.16 kgf) is 3 to 28 g/10 min. When the MFR is within the above range, appropriate fluidity is imparted to the polyolefin (A) during molding of a container cap, so that the formability of the container cap is improved. In addition, when the relative viscosity of the polyamide (C) is within a range to be described below, the polyamide (C) is easily dispersed in a layered form, and further, the polyamide (C) is easily unevenly distributed in the top surface portion. From the viewpoints, the MFR of the polyolefin (A) is more preferably 5 to 26 g/10 min, even more preferably 6 to 24 g/10 min. Furthermore, the MFR is a value measured in accordance with JIS K 7210-1: 2014.

(Acid-modified Polyolefin (B))

The acid-modified polyolefin (B) plays a role in adhering the polyolefin (A) and the polyamide (C) constituting the resin composition. By using the acid-modified polyolefin (B) in the container cap, the adhesive strength between the polyolefin (A) and the polyamide (C) can be improved. In addition, the polyamide (C) is easily dispersed in a layered form by using the acid-modified polyolefin (B), so that the gas barrier property is more easily improved. Furthermore, it becomes easy to unevenly distribute the polyamide (C) on the top surface portion.

It is preferred that the acid-modified polyolefin (B) is a polyolefin grafting-modified with an unsaturated carboxylic acid or an anhydride thereof. The acid-modified polyolefin is generally widely used as a compatibilizer or an adhesive. As the polyolefin used for the acid-modified polyolefin (B), those exemplified hereinabove for the polyolefin (A) are used, and preferably, a polypropylene resin or a polyethylene resin is used. Preferably, the acid-modified polyolefin (B) is one prepared by modifying the same type of polyolefin as that of the used polyolefin (A). That is, when the polyolefin (A) is a polyethylene resin, it is preferred that the acid-modified polyolefin (B) is also one prepared by modifying a polyethylene resin, and when the polyolefin (A) is a polypropylene resin, it is preferred that the acid-modified polyolefin (B) is also one prepared by modifying a polypropylene resin. Accordingly, as the acid-modified polyolefin (B), an acid-modified polyolefin prepared by modifying a polypropylene resin is more preferred.

Specific examples of the unsaturated carboxylic acid or an anhydride thereof include acrylic acid, methacrylic acid, α-ethyl acrylic acid, maleic acid, fumaric acid, itaconic acid, citraconic acid, tetrahydrophthalic acid, chloromaleic acid, butenylsuccinic acid, and an acid anhydrides thereof. In particular, maleic acid and maleic anhydride are preferably used.

As a method of obtaining an acid-modified polyolefin by graft-copolymerizing the polyolefin with the unsaturated carboxylic acid or an anhydride thereof, various known methods in the related art can be used. For example, there can be mentioned a method of melting a polyolefin in an extruder or the like followed by copolymerizing with a graft monomer added thereto, a method of dissolving a polyolefin in a solvent followed by copolymerizing with a graft monomer added thereto, and a method of preparing an aqueous suspension of a polyolefin followed by copolymerizing with a graft monomer added thereto.

It is preferred that the melt flow rate (MFR) of the acid-modified polyolefin (B) at 190° C. under a load of 21.18 N (2.16 kgf) is within a range of 1 to 25 g/10 min. When the MFR of the acid-modified polyolefin (B) is adjusted within the above range, appropriate fluidity is imparted to the acid-modified polyolefin (B) during the molding, so that the formability of the container cap becomes good, and in addition, the polyamide (C) is easily dispersed in a layered form. Furthermore, it becomes easy to unevenly distribute the polyamide (C) on the top surface portion. The MFR of the acid-modified polyolefin (B) is more preferably 2 to 23 g/10 min, even more preferably 4 to 20 g/10 min.

As an index of the modification rate of the acid-modified polyolefin (B), an acid value can be mentioned. The acid value of the acid-modified polyolefin (B) is measured in accordance with the method described in JIS K 0070: 1992. The acid value of the acid-modified polyolefin (B) is preferably more than 15 mgKOH/g and 30 mgKOH/g or less.

When the acid value is higher than 15 mgKOH/g, the acid-modified polyolefin (B) is more bonded to the terminal amino group of the polyamide (C) during the cap molding. Consequently, the fluidity of the polyamide (C) is suppressed during the molding, so that the polyamide (C) is unevenly distributed on the cap top surface portion, and the proportion of the polyamide in the cap top surface portion is easily increased. Further, the polyamide (C) is easily dispersed in a layered form, and the adhesive strength of the polyamide (C) to the polyolefin (A) is easily improved. In addition, when the acid value is 30 mgKOH/g or less, the fluidity of the polyolefin (A) and the polyamide (C) is made appropriate to prevent the surface of the cap from being roughened or the thickness from being uneven.

From the viewpoint of making the fluidity appropriate and facilitating the uneven distribution of the polyamide (C) on the cap top surface, the acid value of the acid-modified polyolefin (B) is more preferably 17 to 25 mgKOH/g, even more preferably 18 to 22 mgKOH/g.

(m-Xylene Group-containing Polyamide (C))

The m-xylylene group-containing polyamide (C) has a good gas barrier property by having a m-xylylene group. The m-xylylene group-containing polyamide (C) functions as a gas barrier resin, and enables gas permeability of the container cap, such as oxygen permeability to be reduced. The m-xylylene group-containing polyamide (C) contains a diamine unit and a dicarboxylic acid unit, and the diamine unit has a structural unit (a m-xylylenediamine unit) derived from m-xylylenediamine.

Furthermore, the diamine unit in the polyamide (C) may have a diamine unit other than the m-xylylenediamine unit. Examples of a compound capable of constituting the diamine unit other than the m-xylylenediamine unit include diamines having an aromatic ring, such as paraxylylenediamine and orthoxylylenediamine, diamines having an alicyclic structure such as 1,3-bis(aminomethyl)cyclohexane, 1,4-bis(aminomethyl)cyclohexane, and 1-amino-3-aminomethyl-3,5,5-trimethylcyclohexane, and aliphatic diamines such as tetramethylenediamine, pentamethylenediamine, hexamethylenediamine, octamethylenediamine, nonanemethylenediamine, 2-methyl-1,5-pentanediamine, polyoxyalkylenediamine, and polyetherdiamine, but are not limited thereto. Further, these compounds may be used either alone or in combination of two or more thereof.

From the viewpoint of imparting appropriate crystallinity and flexibility, it is preferred that the dicarboxylic acid unit in the polyamide (C) has a structural unit (an α,ω-dicarboxylic acid unit) derived from α,ω-linear aliphatic dicarboxylic acid having 4 to 20 carbon atoms (hereinafter, simply referred to as "α,ω-dicarboxylic acid"). Examples of the α,ω-dicarboxylic acid include succinic acid, glutaric acid, adipic acid, pimelic acid, suberic acid, azelaic acid, sebacic acid, 1,10-decanedicarboxylic acid, 1,11-undecane dicarboxylic acid, and 1,12-dodecane dicarboxylic acid, and the like, but are not limited thereto. These acids may be used either alone or in combination of two or more thereof.

From the viewpoint of crystallinity, gas barrier property, flexibility, and the like, as the α,ω-dicarboxylic acid, α,ω-linear aliphatic dicarboxylic acid having 6 to 14 carbon atoms is preferred, and α,ω-linear aliphatic dicarboxylic acid having 6 to 10 carbon atoms is more preferred. Further, among the α,ω-linear aliphatic dicarboxylic acids, adipic acid and sebacic acid are more preferred, and adipic acid is particularly preferred from the viewpoint of making the gas barrier property excellent.

In addition, the dicarboxylic acid unit may have a dicarboxylic acid unit other than the α,ω-dicarboxylic acid unit in addition to the α,ω-dicarboxylic acid unit. Examples of the compound capable of constituting the dicarboxylic acid unit other than the α,ω-dicarboxylic acid unit include aliphatic dicarboxylic acids other than α,ω-dicarboxylic acid, such as methylmalonic acid, methylsuccinic acid, malic acid and tartaric acid, alicyclic dicarboxylic acids such as 1,3-cyclohexanedicarboxylic acid and 1,4-cyclohexanedicarboxylic acid, and aromatic dicarboxylic acids such as terephthalic acid, isophthalic acid, orthophthalic acid, xylylene dicarboxylic acid, and naphthalene dicarboxylic acid, but are not limited thereto. These compounds may be used either alone or in combination of two or more thereof.

As the dicarboxylic acid other than α,ω-dicarboxylic acid, isophthalic acid and 2,6-naphthalenedicarboxylic acid are preferred, and isophthalic acid is more preferred. By using these dicarboxylic acids, particularly isophthalic acid, it is possible to easily obtain a polyamide (C) excellent in gas barrier performance without inhibiting the polycondensation reaction during the preparation of the polyamide (C).

More suitable examples of the polyamide (C) include a polyamide in which a diamine unit contains 70 mol % or more of a m-xylylenediamine unit, and a dicarboxylic acid unit contains 70 mol % or more of a structural unit derived from a dicarboxylic acid selected from the group consisting of α,ω-dicarboxylic acid and isophthalic acid, and has a molar ratio of the structural unit derived from α,ω-dicarboxylic acid and the structural unit derived from isophthalic acid of 30:70 to 100:0.

The gas barrier performance of the polyamide (C) is more easily improved by using 70 mol % or more of the diamine unit as the m-xylylenediamine unit. Furthermore, by containing a predetermined amount or more of the α,ω-dicarboxylic acid unit as the dicarboxylic acid unit as described above, flexibility, crystallinity, and the like of the polyamide (C) are easily improved without lowering the gas barrier performance. Further, the above-mentioned more preferred example of the polyamide (C) may or may not have a structural unit (an isophthalic acid unit) derived from isophthalic acid, but the gas barrier performance is easily improved by having an isophthalic acid unit.

The above-mentioned molar ratio of the α,ω-dicarboxylic acid unit to the isophthalic acid unit is more preferably 50:50 to 100:0, even more preferably 70:30 to 100:0, and still even more preferably 90:10 to 99:1.

As described above, the diamine unit in the polyamide (C) preferably contains 70 mol % or more of the m-xylylenediamine unit, more preferably 80 to 100 mol %, and even more preferably 90 to 100 mol %, and a diamine unit consisting of the m-xylylenediamine unit (that is, the m-xylylenediamine unit is 100 mol %) is particularly preferred. Thus, when the content of the m-xylylenediamine unit is increased, the gas barrier performance is more easily improved.

In addition, in the dicarboxylic acid unit in the polyamide (C), the total amount of the α,ω-dicarboxylic acid unit and the isophthalic acid unit is preferably 70 mol % or more as described above, but more preferably 80 to 100 mol %, and even more preferably 90 to 100 mol %, and as the dicarboxylic acid unit, an α,ω-dicarboxylic acid unit, an isophthalic acid unit, or a dicarboxylic acid unit consisting of these two components (that is, a dicarboxylic acid unit in which the total amount is 100 mol %) is particularly preferred. Here, the α,ω-dicarboxylic acid unit means a structural unit derived from an α,ω-linear aliphatic dicarboxylic acid having 4 to 20 carbon atoms as described above, but means preferably an α,ω-linear aliphatic dicarboxylic acid unit having 6 to 14 carbon atoms, more preferably an α,ω-linear aliphatic dicarboxylic acid unit having 6 to 10 carbon atoms, and particularly preferably an adipic acid unit.

In the polyamide (C), it is preferred that the ratio of the content of the diamine unit and the content of the dicarboxylic acid unit (mol % with respect to the total structural units) is substantially the same from the viewpoint of the polymerization reaction, it is more preferred that the content of the dicarboxylic acid unit is ±2 mol % of the content of the diamine unit, but as described below, in order to increase the terminal amino group concentration, it is more preferred that the content of the diamine unit is higher than the content of the dicarboxylic acid unit.

The polyamide (C) may be composed of a diamine unit and a dicarboxylic acid unit, but may contain a copolymer unit other than a diamine unit and a dicarboxylic acid unit as long as the effects of the present invention are not impaired. Examples of a monomer capable of constituting such copolymer units include lactams such as ε-caprolactam and laurolactam, α-amino acids such as alanine, 2-aminobutyric acid, valine, norvaline, leucine, norleucine, t-leucine, isoleucine, serine, threonine, cysteine, methionine, 2-phenylglycine, phenylalanine, tyrosine, histidine, tryptophan, and proline, β-amino acids such as 3-aminobutyric acid, and aminocarboxylic acids such as aminocaproic acid, aminoundecanoic acid, and p-aminomethyl benzoic acid.

In the polyamide (C), the proportion of the copolymer units other than the diamine unit and the dicarboxylic acid unit is preferably 30 mol % or less, more preferably 20 mol % or less, and even more preferably 15 mol % or less.

Furthermore, in order to adjust the molecular weight and the terminal amino group concentration of the polyamide (C), a monofunctional compound may be reacted with the terminal amino group or the terminal carboxy group of the polyamide (C). Such a monofunctional compound may be one having reactivity with the terminal amino group or the terminal carboxy group of the polyamide (C), but examples of a monocarboxylic acid include monocarboxylic acids such as acetic acid, propionic acid, butyric acid, valeric acid, caproic acid, caprylic acid, lauric acid, tridecylic acid, myristic acid, palmitic acid, stearic acid, pivalic acid, cyclohexanecarboxylic acid, benzoic acid, toluic acid, and naphthalenecarboxylic acid. Further, acid anhydrides such as monoamine and phthalic anhydride, monoisocyanate, monoacid halogen compounds, monoester compounds, monoalcohol compounds, and the like may be used.

There are some indices of the polymerization degree of the polyamide (C), but relative viscosity is generally used. The relative viscosity of the polyamide (C) used in the present invention is preferably 1.5 to 4.2. By setting the relative viscosity to 1.5 or more, the fluidity of the polyamide (C) during the molding is suppressed, and it becomes easy to unevenly distribute the polyamide (C) on the cap top surface portion. Further, it becomes difficult to be compatibilized with the polyolefin (A), and a layered dispersion state is easily formed. Meanwhile, by setting the relative viscosity to 4.2 or less, it is possible to prevent the polymerization time from becoming longer than necessary and to reduce the production costs of the polyamide (C). From the viewpoints, the relative viscosity is more preferably 2.0 to 3.5, and even more preferably 2.4 to 3.0.

In addition, the relative viscosity referred to here is a ratio of a dropping time (t) obtained by dissolving 0.2 g of polyamide in 20 mL of 96% sulfuric acid and being measured at 25° C. using a Canon Fenske viscometer to a dropping time ($t_0$) of 96% sulfuric acid itself measured in the same manner, and is represented by the following equation.

Relative viscosity=$t/t_0$

The melting point of the polyamide (C) is typically 200 to 255° C., preferably 210 to 250° C., and more preferably 220 to 245° C. By setting the melting point of the polyamide (C) within the above range, it is possible to make the melting point of the polyamide (C) sufficiently higher than, for example, the melting points of the polyolefin (A) and the acid-modified polyolefin (B). Moreover, when the container cap is injection-molded, the components (A) and (B) are melted and mixed in a sufficiently fluidized state, while the resin composition can be injected into the cavity without melting at least a part of the polyamide (C). Accordingly, it becomes easy to unevenly distribute the polyamide (C) on the cap top surface portion, and the polyamide (C) is easily dispersed in a layered form. Furthermore, by setting the melting point to the upper limit value or less, it is possible to prevent the molding temperature from becoming higher than necessary.

Further, the melting point is a melting point measured by a differential scanning calorimeter (DSC), and the detailed measurement conditions are the same as those described in the Examples to be described below.

In addition, the terminal amino group concentration of the polyamide (C) is preferably 10 to 100μ equivalent/g. By setting the terminal amino group concentration to 10μ equivalent/g or more, the amount of the polyamide (C) bonded to the acid-modified polyolefin (B) is increased, so that the fluidity of the polyamide (C) during the molding is suppressed. Consequently, the polyamide (C) is unevenly distributed on the cap top surface portion, so that the proportion of polyamide in the top surface portion is easily increased. Furthermore, the polyamide (C) is easily dispersed in a layered form. Meanwhile, by setting the terminal amino group concentration to 100μ equivalent/g or less, an appropriate molecular weight of the polyamide (C) can be secured and fluidity can be prevented from becoming lower than necessary. Further, the polyamide (C) is also prevented from being decomposed by heating during the molding.

From the viewpoints, the terminal amino group concentration of the polyamide (C) is more preferably 12 to 50μ equivalent/g, and even more preferably 14 to 30μ equivalent/g.

A method of adjusting the terminal amino group concentration of the polyamide (C) is not particularly limited, but for example, when the polyamide (C) is produced by polycondensation, the content of diamine and dicarboxylic acid may be adjusted. Alternatively, the content may be adjusted by reacting the above-mentioned monofunctional compound with the terminal amino group and the like of the polyamide (C). However, it is preferred to adjust the terminal amino group concentration by adjusting the content of a diamine and a dicarboxylic acid.

The polyamide (C) is obtained by polycondensation of the above-mentioned diamine and dicarboxylic acid. As a polymerization method, a melt polycondensation method can be mentioned, and for example, there is a method where a nylon salt of a diamine and a dicarboxylic acid is heated under pressure in the presence of water, and subjected to polycondensation in a melt state while the added water and the condensed water are removed. In addition, the polyamide (C) is also produced by a method of directly adding a diamine to a dicarboxylic acid in a melt state for polycondensation. In this case, for keeping the reaction system to be in a uniform liquid state, a diamine is continuously added to a dicarboxylic acid and during the time, polycondensation is carried out while the reaction system is heated such that the reaction temperature is not lower than the melting point of the oligoamide and the polyamide being produced.

In the polycondensation system for the polyamide (C), a phosphorus atom-containing compound may be added for realizing the effect of promoting the amidation reaction and the effect of preventing coloration during polycondensation.

Examples of the phosphorus atom-containing compound include dimethylphosphinic acid, phenylmethyl phosphinic acid, hypophosphorous acid, sodium hypophosphite, potassium hypophosphite, lithium hypophosphite, calcium phosphite, ethyl hypophosphite, phenyl phosphonous acid, sodium phenyl phosphonite, potassium phenyl phosphonite, lithium phenyl phosphonite, ethyl phenyl phosphonite, phenylphosphonic acid, ethyl phosphonic acid, sodium phenyl phosphonate, potassium phenyl phosphonate, lithium phenyl phosphonate, diethyl phenyl phosphonate, sodium ethyl phosphonate, potassium ethyl phosphonate, phosphorous acid, sodium hydrogenphosphite, sodium phosphite, triethyl phosphite, triphenyl phosphite, and pyrophosphorous acid. Among the compounds, particularly metal hypophosphites such as sodium hypophosphite, potassium hypophosphite, and lithium hypophosphite are preferably used because the effect of promoting the amidation reaction is high and the effect of preventing coloring is also excellent, and in particular, sodium hypophosphite is preferred, but the phosphorus atom-containing compound that can be used in the present invention is not limited to these compounds.

The additive amount of the phosphorus atom-containing compound added in the polycondensation system for the polyamide (C) is preferably 1 to 500 ppm, more preferably 5 to 450 ppm, and even more preferably 10 to 400 ppm, equivalent to the concentration of the phosphorus atoms in the polyamide (C) from the viewpoint of preventing coloration of the polyamide (C) during the polycondensation.

In the polycondensation system for the polyamide (C), an alkali metal compound or an alkaline earth metal compound is preferably added in combination with the phosphorus atom-containing compound. To prevent the polyamide (C) from being colored during the polycondensation, a phosphorus atom-containing compound need to be present in sufficient amount, but in order to adjust the reaction rate of the amidation, an alkali metal compound or an alkaline earth metal compound preferably coexists with the phosphorus atom-containing compound.

Such metal compounds include, for example, alkali metal/alkaline earth metal hydroxides such as lithium hydroxide, sodium hydroxide, potassium hydroxide, rubidium hydroxide, cesium hydroxide, magnesium hydroxide, calcium hydroxide, and barium hydroxide; and alkali metal/alkaline earth metal acetates such as lithium acetate, sodium acetate, potassium acetate, rubidium acetate, cesium acetate, magnesium acetate, calcium acetate, and barium acetate but can be used without being limited to these compounds.

When an alkali metal compound or an alkaline earth metal compound is added in the condensation polycondensation system for the polyamide (C), the value determined by dividing the mole number of the compound by that of the phosphorus atom-containing compound is preferably 0.5 to 2.0, and more preferably 0.6 to 1.8. By setting the additive amount of an alkali metal compound or an alkaline earth metal compound within the above-mentioned range, it is possible to suppress the generation of gel while achieving the effect on the promotion of amidation reaction from the phosphorus atom-containing compound.

Furthermore, the above-mentioned monofunctional compound may be added to the polycondensation system in order to adjust the molecular weight or the terminal amino group concentration of the polyamide (C). Further, monomers capable of constituting a copolymer unit other than the amine unit and the dicarboxylic acid unit may be appropriately added, if necessary.

It is preferred that the polyamide (C) obtained by the melt condensation polycondensation is taken out from a reaction system such as a reaction can and pelletized. The polyamide (C) obtained by the melt polycondensation, preferably the pelletized polyamide (C), may be dried, or may be further subjected to solid-phase polymerization for increasing the polymerization. As a heater used for the drying or the solid phase polymerization, a continuous heated-air dryer; rotating drum heaters also called a tumble dryer, a conical dryer, and a rotary dryer; and a conical heater internally provided with a rotor blade called a Nauta mixer can be suitably used, but publicly-known methods and devices can be used without being limited to these heaters. In particular, when a polyamide is subjected to solid phase polymerization, a rotating drum heater among the above-mentioned devices is preferably used because the heater can seal the system and easily promote the polycondensation without the presence of oxygen that causes the coloring.

(Blending Ratio of Materials)

Regarding the blending ratio of the materials in the resin composition, the polyolefin (A) is, relative to the entire amount of the resin composition, 70 to 94% by mass, the acid-modified polyolefin (B) is 3 to 15% by mass, and the polyamide (C) is 3 to 15% by mass. Further, relative to the entire amount of the resin composition, preferably, the polyolefin (A) is 72 to 90% by mass, the acid-modified polyolefin (B) is 5 to 14% by mass, and the polyamide (C) is 5 to 14% by mass, and more preferably, the polyolefin (A) is 74 to 88% by mass, the acid-modified polyolefin (B) is 6 to 13% by mass, and the polyamide (C) is 6 to 13% by mass. However, the total of the three components (A) to (C) is not more than 100% by mass. The total of the three components (A) to (C) relative to the entire amount of the resin composition is 76% by mass or more, preferably 76 to 100% by mass, more preferably 82 to 100% by mass, even more preferably 86 to 100% by mass, still even more preferably 90 to 100% by mass, further more preferably 95 to 100% by mass, and particularly preferably 100% by mass (that is, the resin composition is composed of only the three components (A) to (C)).

In the present invention, by setting the blending ratio of materials within the above-described range, the ratio (X/Y) is easily set within a predetermined range as described below, so that it is possible to efficiently increase the gas barrier property of the cap. In addition, the proportion of the polyamide (C) on the cap side surface portion does not rise higher than necessary, and cracks are prevented from occurring at the cap side surface portion at the time of attaching and fastening the cap to the container.

(Other Components)

In addition to the three components of the polyolefin (A), the acid-modified polyolefin (B) and the m-xylylene group-containing polyamide (C), various materials may be blended with the resin composition as long as the effects of the present invention are not impaired. For example, it is possible to add polyamides other than the m-xylylene group-containing polyamide (C) such as Nylon 6, Nylon 66, Nylon 666, Nylon 610, Nylon 11, and Nylon 12; an ionomer; various modified polyethylenes such as an ethylene-ethyl acrylate copolymer or an ethylene-methyl acrylate copolymer; a polystyrene; various polyesters such as polyethylene terephthalate; a styrene-butadiene copolymer or the hydrogenated product thereof; and various thermoplastic elastomers.

Furthermore, it is possible to add additives such as an antioxidant, a matting agent, a heat-resistant stabilizer, a weathering stabilizer, an ultraviolet absorber, a nucleating agent, a plasticizer, a flame retarder, an antistatic agent, a color protector, a lubricant, an anti-gelling agent, clay such as layered silicate or a nanofiller. These additives may be added to the molding machine in a state of being mixed with one or more of the components (A), (B) and (C) in advance.

[Container Cap]

FIG. 1 is a cross-sectional view illustrating a container cap. Hereinafter, a structure of a container cap 10 will be described in detail with reference to the drawing by using FIG. 1. The container cap 10 is a lid for closing a mouth portion of the container, and includes a cap top surface portion 11 disposed above the mouth portion, and a cap side surface portion 12 which falls vertically from the peripheral edge of the cap top surface portion 11 and is disposed so as to surround the outer periphery of the mouth portion. The container cap 10 screws the outer peripheral surface of the mouth portion of the container provided with the male screw, and closes the mouth portion of the container. Accordingly, on the inner peripheral surface of the cap side surface portion 12, a female screw 13 that can be screwed with the male screw at the mouth portion of the container is formed.

The container cap 10 (that is, the cap top surface portion 11 and the cap side surface portion 12) is a molded article formed of the above-mentioned resin composition. The molded article is preferably an injection-molded article formed by injection molding to be described below, and the cap top surface portion 11 and the cap side surface portion 12 are integrally molded by injection molding. The polyamide (C) is not uniformly mixed with the polyolefin (A) and the acid-modified polyolefin (B) in the molded article, but is dispersed in a granular or layered form so as to have a certain size, and is preferably dispersed in a layered form. By dispersing the polyamide (C) in a layered form, it becomes possible to further improve the gas barrier property of the container cap. Further, the polyamide (C) may be dispersed in a layered form in the cap top surface portion 11.

The polyamide (C) dispersed in a layered form may partially continuously form a continuous phase. In addition, the polyamide (C) dispersed in a layered form may be in a dispersed state where the polyamide (C) exists alternately to the polyolefin (A) in the thickness direction. Furthermore, the polyamide (C) dispersed in a layered form is typically spread in a layered or planar shape along the surface direction in the cap top surface portion.

Further, a seal portion 14 is formed on the inner surface of the cap top surface portion 11. The seal portion 14 tightly contacts the mouth portion of the container to seal the container. In addition, FIG. 1 illustrates an example in which the seal portion 14 is formed by annular protrusions, but the seal portion 14 may be a sheet-shaped member formed on the inner surface of the cap top surface portion 11, or may have other configurations.

The seal portion 14 may be formed integrally with the cap top surface portion 11, but may be formed by a member separate from the cap top surface portion 11. When integrally molded, the seal portion 14, together with the cap top surface portion 11 and the cap side surface portion 12, is formed as a part of the molded article (that is, the cap top surface portion 11) by injection molding or the like to be described below. Meanwhile, when being molded as a separate member, the seal portion may be attached to the inner surface of the cap top surface portion of the molded article formed by injection molding or the like to be described below by adhesion, pressure bonding, fusion bonding, fitting, or the like.

In the container cap of the present invention, a ratio (X/Y) of a percentage (X) of polyamide-derived nitrogen in the cap top surface portion 11 to a percentage (Y) of polyamide-derived nitrogen in the cap side surface portion 12 is 1.2 to 3.0. The percentages (X) and (Y) of nitrogen are indices illustrating the ratio of polyamide in the cap top surface portion 11 and the cap side surface portion 12, respectively. When the ratio (X/Y) is less than 1.2, the polyamide (C) is not sufficiently unevenly distributed on the cap top surface portion 11, and a large amount of polyamide (C) is present on the cap side surface portion 12. Consequently, when attaching and fastening the container cap 10 to the mouth portion, the polyamide (C) present on the cap side surface portion is peeled off from the polyolefin (A), and cracks easily occur on the cap. Furthermore, such cracks on the cap side surface portion easily occur when the polyamide (C) is dispersed in a layered form.

Further, the cap top surface portion 11 faces the space in the container closed by the container cap 10, but the cap side surface portion 12 is disposed on the outer peripheral side of the mouth portion of the container, so that the cap side surface portion 12 does not substantially face the space inside the container. Consequently, in order to enhance the gas barrier property of the container closed by the container cap 10, it is better to enhance the gas barrier property of the cap top surface portion 11. However, when the ratio (X/Y) is less than 1.2, it becomes difficult to secure the gas barrier property of the cap top surface portion 11, and it becomes difficult to improve the gas barrier property of the container closed by the cap 10. Meanwhile, when it is tried to make the ratio (X/Y) larger than 3.0, it becomes difficult to produce the cap 10 by the production method to be described below.

From the viewpoint of prevention of cracks on the cap side surface portion, improvement in the gas barrier property of the top surface portion, and ease of production, the ratio (X/Y) is preferably 1.4 to 2.8, and more preferably 2.0 to 2.5.

In addition, the percentages (X) and (Y) of polyamide-derived nitrogen are obtained by measuring the amounts of nitrogen on the cap top surface portion and the cap side surface portion by a total nitrogen analysis, and calculating the percentage of polyamide-derived nitrogen on the cap top surface portion and the cap side surface portion, respectively from the measured values, as described in the Examples to be described below. Moreover, the ratio (X/Y) is obtained from the calculated percentages (X) and (Y) of polyamide-derived nitrogen.

Furthermore, the resin composition may include a compound having a nitrogen atom other than the polyamide (C). In such a case, a compound having a nitrogen atom other than the polyamide (C) is identified and quantified to calculate the amount of nitrogen derived from the compound. Moreover, the percentage of polyamide-derived nitrogen may be calculated by subtracting the amount of nitrogen from the amount of nitrogen obtained by the total nitrogen analysis.

Further, the "polyamide" in the percentages (X) and (Y) of polyamide-derived nitrogen means a value that includes the percentage of nitrogen derived from such polyamide when a polyamide other than the m-xylylene group-containing polyamide (C) is included in the resin composition.

The diameter of the container cap (that is, the molded article formed from the resin composition) is preferably 10 to 200 mm, and more preferably 20 to 100 mm. In addition, the thickness (the thickness of the cap top surface portion and the cap side surface portion of the molded article) is preferably 0.1 to 5 mm, and more preferably 0.5 to 2 mm. The container cap having such a size enables the polyamide (C) to be easily unevenly distributed on the cap top surface portion when the container cap is produced by the production method to be described below.

The container cap may be used for a container formed of any material such as a resin container and a glass container, but it is preferred to use the container cap for a container having a high hardness of the mouth portion. Specifically, it is preferred to use the container cap for a container such as a glass container whose mouth portion is made of glass. When the hardness of the mouth portion is high, such as a mouth portion made of glass, the mouth portion is hardly deformed when the container cap is attached and fastened to the mouth portion. Consequently, at the time of fastening the cap, a high stress acts on the cap side surface portion, so that the above-mentioned cracks easily occur, but since the container cap of the present invention has a low content ratio of polyamide in the cap side surface portion, cracks of the cap side surface portion hardly occur even when the hardness of the mouth portion of the container is high.

[Method of Producing Container Cap]

Hereinafter, an embodiment of the method of producing a container cap will be described.

A production method according to an embodiment of the present invention is a method of obtaining a molded article constituting a container cap by injection molding a resin composition including the above-mentioned components (A), (B), and (C).

Figure 2:
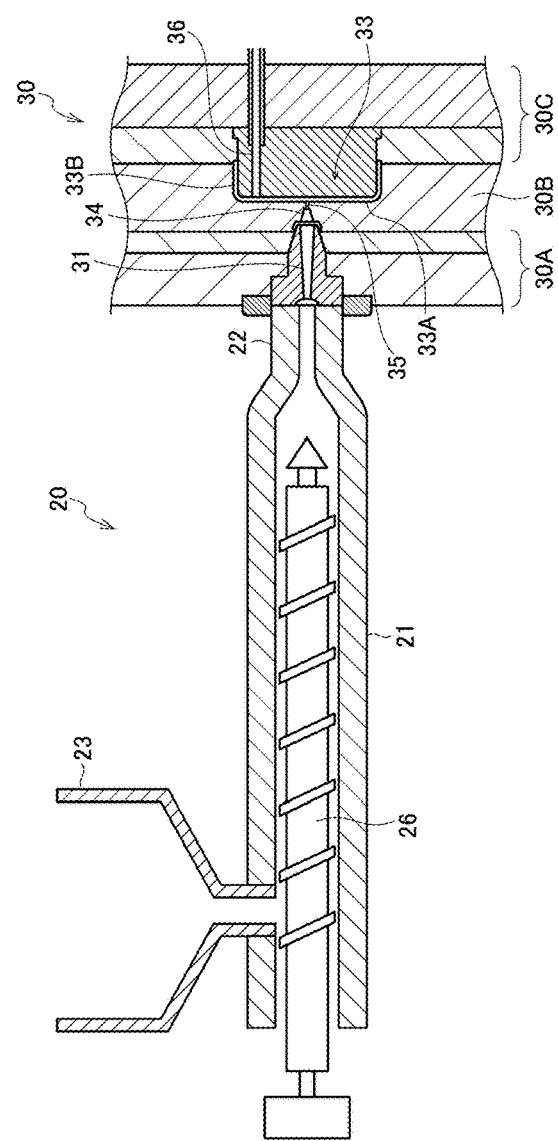
FIG. 2 is a schematic cross-sectional view illustrating an example of an injection molding machine.

An example of an injection molding machine used for the injection molding of the present production method is illustrated in FIG. 2. As illustrated in FIG. 2, an injection molding machine 20 includes a heating cylinder 21, a nozzle 22 provided at a tip of the heating cylinder 21, a hopper 23 attached to the heating cylinder 21, and a mold 30 connected to a tip of the nozzle 22.

The heating cylinder 21 is not particularly limited as long as the heating cylinder 21 has a structure that can be generally used in the injection molding machine 20, but for example, a heating cylinder having a heater (not illustrated) for heating the interior of the cylinder and a screw 26 therein is used. Furthermore, the nozzle 22 is typically heated by a heater such that the resin composition passing through the nozzle 22 is maintained at a predetermined temperature. The temperatures of the heaters of the cylinder 21 and the nozzle 22 are set to, for example, 200 to 300° C., preferably 210 to 270° C. By setting the temperature within the above temperature range, the resin temperature at the tip of the nozzle 22 is easily adjusted within a temperature range to be described below.

The mold 30 has a cavity 33 formed therein, and has a sprue 31 connected to the nozzle 22 and a runner 34 connected to the sprue 31. The runner 34 is connected to the cavity 33 via a pinpoint gate 35. There is one pinpoint gate 35 connected to the cavity 33. That is, the pinpoint gate 35 is what is called a one-point gate. Further, typically, the mold 30 is not heated, and the runner 34 is a cold runner.

As illustrated in FIG. 2, the mold 30 is, for example, a three-piece mold consisting of a fixed mold 30A, a middle mold 30B, and a movable mold 30C. In the three-piece mold, a cavity 33 is formed between the movable mold 30C and the middle mold 30B. In addition, the sprue 31 is provided in the fixed mold 30A, and the runner 34 is provided in the middle mold 30B.

In the three-piece mold, after the injection molding, the three molds 30A, 30B, and 30C are separated and extruded by a sleeve ejection mechanism consisting of ejector pins 36 and the like provided inside the movable mold 30C, and the molded article is taken out. Furthermore, the molded article may also be ejected and taken out by rotating the screw portion by a motor as a screw removal device, and using a sleeve ejection mechanism together.

However, the mold 30 is not limited to a three-piece mold but may be another type of mold. Further, in FIG. 2, only one cavity 33 may be formed in the mold 30, but a plurality of cavities 33 may be formed. In that case, a plurality of runners 34 is connected to the sprue 31, and each runner 34 is connected to the cavity 33 via the pinpoint gate 35.

The cavity 33 has a top surface hollow portion 33A for molding the cap top surface portion and the cap side surface portion and a side surface hollow portion 33B, and the pinpoint gate 35 is connected to the top surface hollow portion 33A. Accordingly, the resin composition is injected into the cavity 33 from the cap top surface portion side by a one point gate. As illustrated in FIG. 2, the pinpoint gate 35 may be provided at a position corresponding to the center of the cap top surface portion, but may be provided at a position other than the position corresponding to the center.

The gate diameter of the pinpoint gate 35 (one point gate) is preferably 0.5 to 1.2 mm, and more preferably 0.6 to 1.0 mm. When the gate diameter is 1.2 mm or less, it becomes difficult for the polyamide (C) to flow into the side surface hollow portion 33B as described below, so that the ratio (X/Y) is easily set within the above range. In addition, when the gate diameter is 0.5 mm or more, there occur problems in that the components constituting the resin composition, in particular, polyamide (C) cannot pass through the pinpoint gate 35.

In the present production method, the components constituting the resin composition such as the components (A), (B) and (C) are charged from the hopper 23 and mixed while being heated inside the heating cylinder 21 and plasticizing the components (A), (B) and (C), and the like and, if necessary, at least a part of the components are melted. Then, the resin composition is injected into the cavity 33 via the nozzle 22, the sprue 31, the runner 34, and the pinpoint gate 35. The resin composition injected into the cavity 33 is cooled and solidified to become an injection-molded article. The injection-molded article is taken out from the mold 30 as described above.

A behavior of the components (A), (B), and (C) inside the injection molding machine 20 is, for example, as follows. The components (A), (B), and (C) are softened and plasticized by the heat received from the heater in the cylinder 21. Here, the polyolefin (A) and the acid-modified polyolefin (B) are sufficiently melted or fluidized and mixed in the cylinder 21. Meanwhile, the polyamide (C) is stretched in a layered form due to a shear stress by, for example, the screw 26 inside the cylinder 21, but because the polyamide (C) has a high melting point, the polyamide (C) melts and does not reach a state of being uniformly mixed in the component (A), and while maintaining a certain size, the polyamide (C) is preferably injected into the cavity 33 in a state of being stretched in a layered form. Consequently, even in the molded article, the polyamide (C) is dispersed in a granular or layered form so as to have a certain size, and preferably is in a state of being dispersed in a layered form.

As described above, in order to inject the polyamide (C) into the cavity 33 in a state of having a certain size and being stretched in a layered form, it is preferred to inject the polyamide (C) by controlling the resin temperature inside the injection molding machine 20. Specifically, the temperature of the heating cylinder 21 or the like may be adjusted such that the resin temperature at the tip of the nozzle 22 falls within a temperature range of −5° C. to +15° C. with respect to the melting point of the polyamide (C). Furthermore, the above temperature range is preferably −5° C. to +10° C., more preferably −5° C. to +5° C. in order to more appropriately disperse the polyamide (C) in a layered form in the molded article.

Further, the resin temperature at the tip of the nozzle 22 may be confirmed by measuring the actual temperature by a thermocouple attached to the tip of the nozzle 22. Alternatively, when the resin temperature can be estimated from the heater temperature of the heating cylinder 21 or the like without measuring the actual temperature, the resin temperature may be obtained by estimation.

In the present invention, in order to achieve the above ratio (X/Y), the ratio (X/Y) needs to be adjusted by maintaining the polyamide at the top surface hollow portion 33A of the cavity 33 such that the polyamide (C) does not flow more into the side hollow portion 33B. Specific examples of the adjustment method include a method in which a certain amount or more of the polyamide (C) is bonded to the acid-modified polyolefin (B) by setting the acid value of the acid-modified polyolefin (B), the terminal amino group concentration of the polyamide (C), and the like to certain ranges, and the gate diameter of the pinpoint gate 35 is set to a relatively small predetermined range.

When a certain amount of the polyamide (C) is bonded to the acid-modified polyolefin (B), the fluidity of the polyamide (C) during the molding can be suppressed at a low level. Then, when the polyamide (C) having such a bonded state and not completely melted is allowed to pass through the pinpoint gate 35 having a predetermined diameter, it is considered that in the polyamide (C), an appropriate shear resistance acts on the pinpoint gate 35, and as a result, the polyamide (C) flows into the top surface hollow portion 33A, but it is likely to be in a state in which much of the polyamide (C) does not flow into the side surface hollow portion 33B. In addition, the polyamide (C) is easily injected into the cavity 33 in a state of being dispersed in a layered form. Furthermore, the preferred range of the gate diameter of the pinpoint gate is as described above.

However, in order to achieve the ratio (X/Y), other adjustment methods can be adopted without being limited to the adjustment method described above.

EXAMPLES

Hereinafter, the present invention will be described in more detail with reference to the Examples, but the present invention is not limited to the following Examples.

Various physical property measurements and evaluation methods are as follows.

(1) MFR (g/10 min) of Polyolefin (A) and Acid-modified Olefin (B)

The measurement was carried out under the conditions of 190° C. and 2.16 kgf in accordance with JIS K 7210-1: 2014 by using a melt indexer manufactured by Toyo Seiki Seisaku-Sho, Ltd.

(2) Acid Value (mgKOH/g) of Acid-modified Polyolefin (B)

The measurement was carried out by neutralization titration in accordance with JIS K0070: 1992. 1 g of the acid-modified polyethylene was accurately weighed and dissolved in 100 mL of xylene at about 120° C. while stirring. After completely dissolving the acid-modified polyethylene therein, a phenolphthalein solution was added thereto, and neutralization titration was carried out by using a 0.1 mol/L potassium hydroxide ethanol solution whose concentration was accurately determined in advance. The acid value was calculated according to the following formula (1) from the dropping amount (T), the factor of the 0.1 mol/L potassium hydroxide ethanol solution (f), 1/10 of the formula weight 56.11 of potassium hydroxide (5.611), and the mass of the acid-modified polyolefin (S):

$$\text{Acid value} = T \times f \times 5.611 / S \quad (1).$$

(3) Relative Viscosity Of Polyamide (C)

0.2 g of the polyamide (C) was accurately weighed and dissolved in 20 mL of 96% sulfuric acid at 20 to 30° C. while stirring. After completely dissolving the polyamide (C) therein, a 5-mL of the resulting solution was rapidly sampled and placed in a Canon-Fenske viscometer, the viscometer was left in a thermostatic chamber at 25° C. for 10 minutes, and then a dropping time (t) of the solution was measured. Also, a dropping time ($t_0$) of the 96% sulfuric acid itself was measured under the same conditions. The relative viscosity was calculated according to the following formula (2) from the t and to:

$$\text{Relative viscosity} = t/t_0 \quad (2)$$

(4) Melting Point

Using a differential scanning calorimeter (manufactured by Shimadzu Corporation, trade name: DSC-60), the sample was melted by heating from room temperature up to 260° C. at a heating rate of 10° C./min under nitrogen stream, and then using liquid nitrogen, the measurement sample was rapidly cooled, and thereafter, a melting point was measured by heating the sample again room temperature up to 260° C. at a rate of 10° C./min. Next, on the resultant chart, the melting peak temperature of the sample was read and used as a melting point.

(5) Terminal Amino Group Concentration 0.3 to 0.5 g of the polyamide was accurately weighed and dissolved in 30 mL of a phenol/ethanol mixed solution (mixed volume ratio 4:1) at room temperature while stirring. After completely dissolving the mixed solution, neutralization titration was carried out by using a 0.01 mol/L aqueous hydrochloric acid solution while stirring, and the terminal amino group concentration; μ equivalent/g ([$NH_2$]) was obtained.

(6) Ratio (X/Y) of Percentages (X) and (Y) of Polyamide-derived Nitrogen

From the resulting cap, for the top surface portion, a range corresponding to 90% of the top surface radius was taken out from the center of the top surface, and for the side surface portion, the remaining portion except for the thickness portion of the top surface portion of the cap was cut out as the side surface portion, and frozen and crushed by using liquid nitrogen. From the resulting crushed product, the nitrogen content rate in the top surface portion and the nitrogen content rate in the side surface portion were measured at a combustion furnace temperature: 950° C., an oven temperature: 65° C., a carrier flow rate: 140 mL/min, an oxygen flow rate: 250 mL/min, and a reference flow rate: 100 mL/min by using a CHN elemental analyzer (manufactured by Thermo Finnigan LLC, trade name: EA1112). The ratio (X/Y) of these nitrogen content rates was calculated as a percentage (X) of polyamide-derived nitrogen to a percentage (Y) of polyamide-derived nitrogen.

(7) Gas Barrier Performance of Container Cap (Oxygen Transmission Rate: OTR)

After the opening of the obtained cap was covered and heat-sealed with a lid made of a film of CPP/aluminum foil/PET=50/9/12 (μm), a hole was perforated on the film (lid), a gas introducing tube and a gas discharge tube were inserted, and the insertion portion was fixed with an epoxy-based adhesive. A nitrogen gas was allowed to flow at 10 mL/min from the gas introducing tube, and the oxygen transmission rate per cap (ml/cap day 0.21 atm) was obtained in accordance with JIS K 7126-2: 2006 under the conditions of temperature 23° C., inside: 0% RH, outside: 50% RH by using an oxygen transmission rate measurement device (manufactured by Mocon Corp., USA, trade name: Ox-Tran2/61).

(8) Evaluation of Strength of Cap Side Surface Portion

The strength of the cap side surface portion was evaluated according to the following criteria by attaching the obtained container cap to the mouth portion of a glass container and checking the state of the cap side surface portion when the head was fastened at a fastening force: 10 N, 30 N by using a pipe wrench-type torque wrench (manufactured by Tohnichi Manufacturing Co., Ltd., trade name: PHL5ON).

A: No cracks occurred on the cap side surface portion even though the head was fastened at any fastening force.

B: No cracks occurred on the cap side surface portion even though the head was fastened at a fastening force of 10 N, but cracks occurred due to the peeling of the polyamide (C) and the like when the head was fastened at a fastening force of 30 N.

C: Even though the head was fastened at any fastening force, cracks occurred due to the peeling of the polyamide (C), and the like.

(9) Evaluation of Dispersion State of Cap Top Surface Portion

The top surface portion of the obtained cap was cut, the cross-section thereof was flattened and smoothed by using a microtome (manufactured by REICHERT-JUNG LIMITED, trade name: ULTRACUT E), and then the polyamide portion was stained by applying dilute iodine tincture (manufactured by Tsukishima Yakuhin Co., Ltd.) onto the cross-section. The dispersion state of the polyamide was observed by using a digital microscope (manufactured by Keyence Corporation, Digital Microscope VHX-1000) and evaluated according to the following evaluation criteria.

A: Most of the polyamide was dispersed in a layered form.

B: Although a part of the polyamide was dispersed in a layered form, a considerable amount of polyamide dispersed in a granular form was seen.

C: Almost all of the polyamide was dispersed in a granular form.

The components (A), (B) and (C) used in the Examples and Comparative Examples are as follows.

<Polyolefin (A)>

PO-1: manufactured by Sumitomo Chemical Co., Ltd., trade name: Noblen AW564, block polypropylene, MFR: 9 g/10 min PO-2: manufactured by Japan Polypropylene Corporation, trade name: Novatech. PP MA3, Homopolypropylene, MFR: 11 g/10 min PO-3: manufactured by Japan Polypropylene Corporation, trade name: Novatech. PP MA1B, Homopolypropylene, MFR: 21 g/10 min <Acid-modified Polyolefin (B)>

AD-1: manufactured by Mitsui Chemical Inc., Trade name: ADMER QE800, maleic anhydride-modified polypropylene, MFR: 9 g/10 min, Acid value: 20 mgKOH/g AD-2: manufactured by Mitsubishi Chemical Inc., Trade name: MODIC P555, maleic anhydride-modified polypropylene, MFR: 7 g/10 min, Acid value: 7.7 mgKOH/g <Polyamide (C)>

Preparation Example 1 (Preparation of Polyamide (PA-1))

Into a pressure-resistant melt polymerization pot with an internal volume of 50 L equipped with a stirrer, a partial condenser, a total condenser, a pressure regulator, a thermometer, a dripping tank, a pump, an aspirator, a nitrogen introducing tube, a bottom drain valve and a strand die, 12,120 g (82.94 mol) of adipic acid (AA), 880 g (5.29 mol) of isophthalic acid (IPA), 10.96 g (0.10 mol) of sodium hypophosphite, and 5.68 g (0.07 mol) of sodium acetate, which were accurately weighed, were put, the melt polymerization pot was sufficiently purged with nitrogen, and then the interior of the melt polymerization pot was sealed, and the inside temperature of the melt polymerization pot was increased to 170° C. with stirring while maintaining the inside pressure at 0.4 MPaG After the temperature reached 170° C., 11,962 g (87.83 mol) of m-xylylenediamine (MXDA) (molar ratio (MXDA/(AA+IPA) of a diamine component/a dicarboxylic acid component introduced)=0.9955) stored in the dripping tank was started to be added dropwise to the molten raw material in the melt polymerization pot, and the interior of the melt polymerization pot was continuously heated to 260° C. while removing the condensed water generated out of the system by maintaining the pressure in the melt polymerization pot at 0.4 MPaG After completion of the dropwise addition of m-xylylenediamine, the interior of the melt polymerization pot was gradually returned to atmospheric pressure, and then the condensed water was removed by continuously depressurizing the interior of the melt polymerization pot to 80 kPa using an aspirator. The stirring was stopped at the time when a predetermined torque was reached by observing the stirring torque of the stirrer during depressurization, the interior of the melt polymerization pot was pressurized with nitrogen, the bottom drain valve was opened, and the resulting product was withdrawn and pelletized, thereby obtaining a molten polymerized product (relative viscosity 2.1) of a pelletized isophthalic acid copolymerized polymethaxylylene adipamide.

Next, the pellet was introduced into a rotating drum heater made of stainless steel and rotated at 5 rpm. The interior of the reaction system was further heated from room temperature to 140° C. under a smaller amount of nitrogen stream by sufficiently replacing the reaction system with nitrogen. At the time when the temperature in the reaction system reached 140° C., the pressure was reduced to 1 torr or less, and the temperature in the system was further increased to 190° C. for 130 minutes. At the time when the temperature in the system reached 190° C., the solid phase polymerization reaction was continued at the same temperature for 60 minutes.

After completion of the reaction, the pressure reduction was terminated and the temperature in the system was lowered under nitrogen stream, and at the time when the temperature reached 60° C., the pellet was extracted, thereby obtaining a polymerized isophthalic acid copolymerized poly(m-xylylene adipamide) (PA-1).

The obtained polyamide (PA-1) was found to have a relative viscosity of 2.8, a melting point of 229° C., an isophthalic acid copolymerization ratio of 6 mol %, and a terminal amino group concentration ([NH$_2$]) of 15µ equivalent/g.

Preparation Example 2 (Preparation of Polyamide (PA-2))

A poly(m-xylylene adipamide) (polyamide (PA-2)) was obtained in the same manner as in Preparation Example 1, except that 12,893 g (88.23 mol) of adipic acid was introduced into the reaction vessel instead of introducing 12,120 g of adipic acid and 880 g of isophthalic acid thereinto. The polyamide (PA-2) was found to have a relative viscosity of 2.7, a melting point of 238° C., and a terminal amino group concentration ([NH$_2$]) of 19µ equivalent/g.

Preparation Example 3 (Preparation of Polyamide (PA-3))

An isophthalic acid copolymerized poly(m-xylylene adipamide) (Polyamide (PA-3)) having an isophthalic acid copolymerization ratio of 6 mol % was obtained in the same manner as in Preparation Example 1, except that the introduction of each monomer was adjusted so as to have a ratio of m-xylylenediamine:adipic acid:isophthalic acid=87.39:82.94:5.29 (mol) (molar ratio (MXDA/(AA+IPA) of a diamine component/a dicarboxylic acid component introduced)=0.9905), and the solid phase polymerization reaction time was set to 300 minutes. The polyamide (PA-3) was found to have a relative viscosity of 2.5, a melting point of 229° C., and a terminal amino group concentration ([NH$_2$]) of 6µ equivalent/g.

Example 1

A container cap having a diameter of 40 mm and a thickness of 1.5 mm was manufactured by an injection molding method by introducing the polyolefin (A), the acid-modified polyolefin (B), and the polyamide (C) obtained in Preparation Example 1 into an injection molding machine (manufactured by Nissei Plastic Industrial Co., Ltd., trade name "NEX80", screw: 36 mmφ, clamping force: 80 tons) at a blending ratio shown in Table 1.

Figure 3:
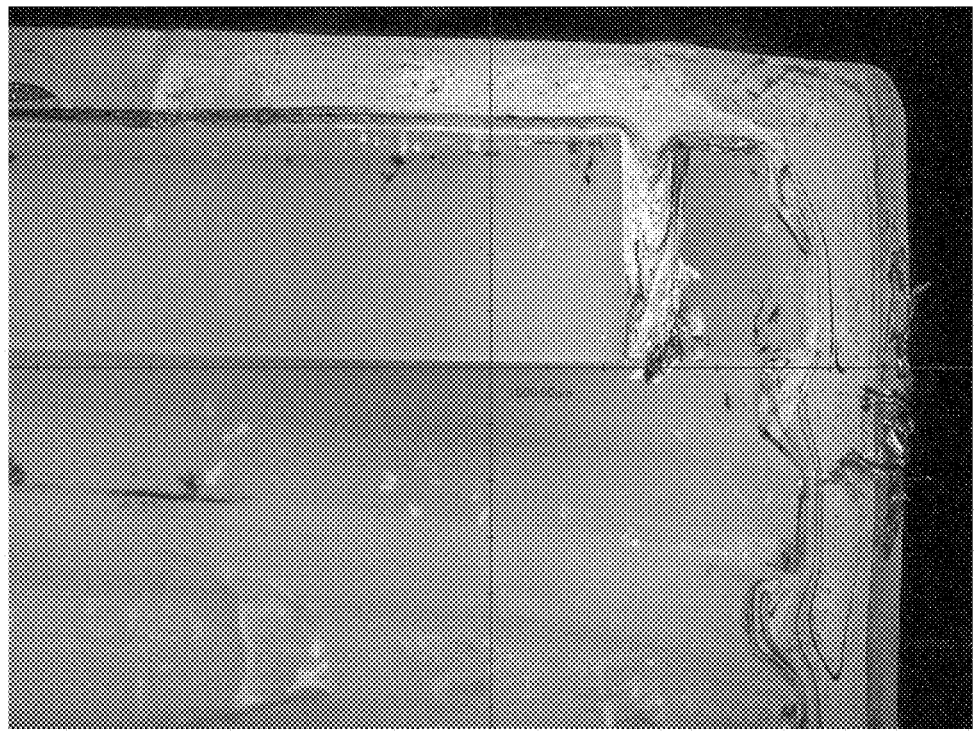
FIG. 3 is a photograph taken by enlarging a cross section of the container cap obtained in Example 1.

In addition, the mold used in the injection molding machine was not heated and provided at room temperature, and was a three-piece type having a sprue with a diameter gradually increased from 3.5 mm to 5 mm and a length of 4 cm, a cold runner with a diameter of 4 mm and a length of 5 cm, and a pinpoint gate (one-point gate) with a gate diameter of 0.7 mm, a cross-sectional shape of a circle, and a length of 1.5 mm, and as illustrated in FIG. 2, the resin composition was injected into the cavity from the top surface portion side. During the injection molding, the cylinder of the injection molding machine was heated by four heaters in order from the upstream side, and the resin temperature at the tip of the nozzle was adjusted to the temperature shown in Table 1 by setting the heater temperature of each heater and nozzle (C1/C2/C3/C4/nozzle) to 220/225/225/225/220(° C.). Furthermore, the injection molding was carried out under the conditions of a screw rotation number: 100 rpm, a plasticization time: 2.37 seconds, a back pressure: 5 MPa, a V/P switching: 10 mm, a cushion amount: 6 mm, and a mold temperature: 25° C. The evaluation results of the obtained container cap are shown in Table 1. Further, the container cap in Example 1 was cut, a m-xylylene group-containing polyamide portion was stained by applying diluted iodine tincture onto the cross section of the container cap, and then a photograph taken by enlarging the cross section is illustrated in FIG. 3.

Examples 2 and 3

Container caps were produced in the same manner as in Example 1, except that the type of polyolefin (A) was changed as shown in Table 1.

Example 4

A container cap was produced in the same manner as in Example 1, except that the type of polyamide (C) was changed as shown in Table 1, and the resin temperature at the tip of the nozzle was adjusted to the temperature shown in Table 1 by setting the heater temperature of each heater and nozzle (C1/C2/C3/C4/nozzle) in the cylinder to 230/235/235/235/230(° C.).

Comparative Example 1

A container cap was produced in the same manner as in Example 1, except that the type of acid-modified polyolefin (B) was changed as shown in Table 1.

Comparative Example 2

Figure 4:
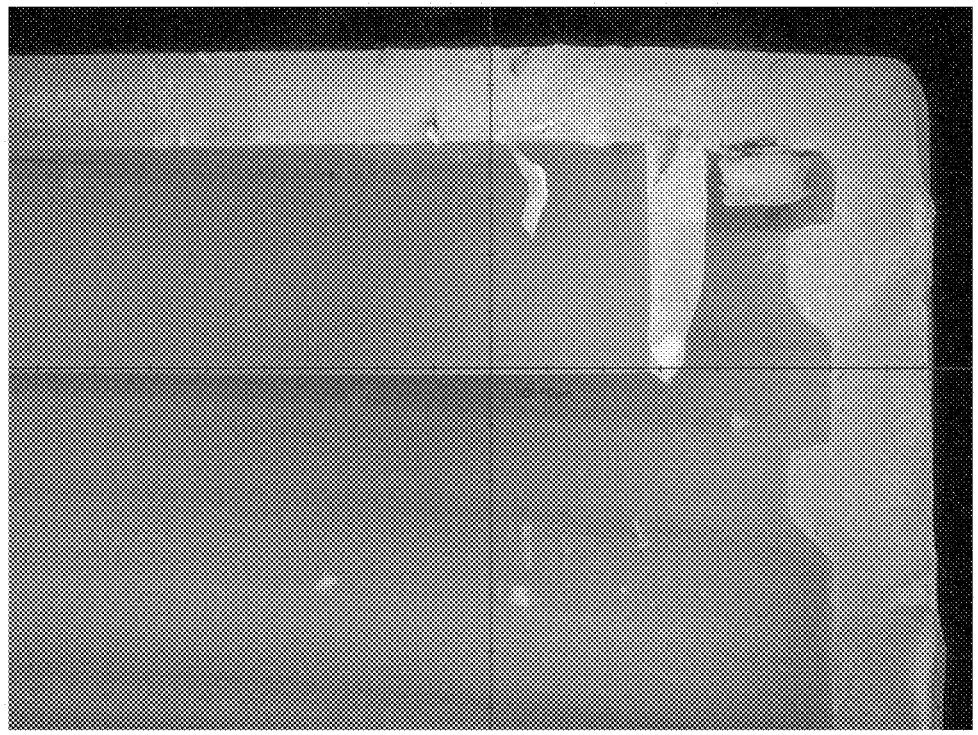
FIG. 4 is a photograph taken by enlarging a cross section of the container cap obtained in Comparative Example 2.

A container cap was produced in the same manner as in Example 1, except that the resin temperature at the tip of the nozzle was adjusted to the temperature shown in Table 1 by setting the heater temperature of each heater and nozzle (C1/C2/C3/C4/nozzle) in the cylinder to 240/245/245/245/240(° C.). The container cap in Comparative Example 2 was cut, a m-xylylene group-containing polyamide portion was stained by applying diluted iodine tincture onto the cross section of the container cap, and then a photograph taken by enlarging the cross section is illustrated in FIG. 4.

Comparative Example 3

A container cap was produced in the same manner as in Example 1, except that the type of polyamide (C) was changed as shown in Table 1.

Comparative Examples 4 and 5

The procedure was carried out in the same manner as in Example 1, except that the acid-modified polyolefin (B) and the polyamide (C) were not used, and various polyolefins (A) shown in Table 1 were used as the resin.

TABLE 1

| | Polyolefin (A) | | Acid-modified polyolefin (B) | | Polyamide (C) | | Resin Temperature (° C.) | Polyamide-derived nitrogen (% by mass) | | | Polyamide content rate (% by mass) | | Oxygen transmission rate (ml/cap · day · 0.21 atm) | Evaluation of strength of side surface portion | Evaluation of dispersion state of cap top surface portion |
|---|---|---|---|---|---|---|---|---|---|---|---|---|---|---|---|
| | Type | Mass (%) | Type | Mass (%) | Type | Mass (%) | | Top surface (X) | Side surface (Y) | Ratio (X/Y) | Top surface (X) | Side surface (Y) | | | |
| Example 1 | PO-1 | 80 | AD-1 | 10 | PA-1 | 10 | 227 | 1.40 | 0.59 | 2.4 | 14.2 | 6.0 | 0.0033 | A | A |
| Example 2 | PO-2 | 80 | AD-1 | 10 | PA-1 | 10 | 227 | 1.33 | 0.64 | 2.1 | 13.5 | 6.5 | 0.0046 | B | A |
| Example 3 | PO-3 | 80 | AD-1 | 10 | PA-1 | 10 | 227 | 1.31 | 0.60 | 2.2 | 13.3 | 6.1 | 0.0038 | B | A |
| Example 4 | PO-1 | 80 | AD-1 | 10 | PA-2 | 10 | 236 | 1.13 | 0.76 | 1.5 | 10.7 | 7.2 | 0.0115 | B | A |
| Comparative Example 1 | PO-1 | 80 | AD-2 | 10 | PA-1 | 10 | 227 | 0.99 | 1.01 | 1.0 | 10.0 | 10.2 | 0.0257 | C | B |
| Comparative Example 2 | PO-1 | 80 | AD-1 | 10 | PA-1 | 10 | 245 | 1.02 | 0.99 | 1.0 | 10.3 | 10.0 | 0.0262 | A | C |
| Comparative Example 3 | PO-1 | 80 | AD-1 | 10 | PA-3 | 10 | 227 | 1.06 | 0.95 | 1.1 | 10.7 | 9.6 | 0.0228 | C | B |
| Comparative Example 4 | PO-1 | 100 | — | — | — | — | — | — | — | — | — | — | 0.0298 | A | — |
| Comparative Example 5 | PO-2 | 100 | — | — | — | — | — | — | — | — | — | — | 0.0271 | A | — |

* The polyamide content rate in Table 1 was calculated by dividing the nitrogen content rates at the top and side surface parts by the nitrogen proportion in the polyamide (C), respectively. In addition, the nitrogen proportions in the polyamides (PA-1) and (PA-3) were 9.9% by mass, and the nitrogen proportion in the polyamide (PA-2) was 10.6% by mass.

In Examples 1 to 4, the polyamide (C) could be unevenly distributed on the cap top surface portion by increasing the ratio (X/Y), and further, the polyamide (C) was dispersed in a layered form. Consequently, the oxygen transmission rate was lowered, so that the gas barrier property of the cap was improved. In addition, the strength of the cap side surface portion was improved, so that it was possible to prevent the occurrence of cracks by preventing peeling of the polyamide (C) when the cap was attached and fastened to the container.

In contrast, in Comparative Examples 1 and 3, since the ratio (X/Y) was low and the polyamide (C) was not unevenly distributed on the cap top surface portion, the strength of the cap side surface portion was lowered, so that peeling of the polyamide (C) easily occurred when the cap was attached and fastened to the container. In addition, in Comparative Example 2, since the resin temperature was high, the ratio (X/Y) was low, the polyamide (C) was dispersed not only in a layered form, but also in a granular form. Consequently, although the strength of the cap side surface portion was comparatively improved, the oxygen transmission rate became high, and the gas barrier property was insufficient. Likewise, in Comparative Examples 4 and 5, since the polyamide (C) was not used, cracks hardly occurred at the cap side surface portion, but the oxygen transmission rate of the cap was high and the gas barrier property was insufficient.

REFERENCE SIGNS LIST

10: Container cap
11: Cap top surface portion
12: Cap side surface portion
20: Injection molding machine
22: Nozzle
30: Mold
31: Sprue
33: Cavity
34: Runner
35: Pinpoint gate

The invention claimed is:

1. A container cap comprising a molded article formed of a resin composition containing 70 to 94% by mass of a polyolefin (A), 3 to 15% by mass of an acid-modified polyolefin (B) and 3 to 15% by mass of a m-xylylene group-containing polyamide (C),
    wherein a ratio (X/Y) of a percentage (X) of polyamide-derived nitrogen in a cap top surface portion to a percentage (Y) of polyamide-derived nitrogen in a cap side surface portion, is from 1.2 to 3.0, as measured by a total nitrogen analysis.

2. The container cap according to claim 1, wherein the m-xylylene group-containing polyamide (C) contains a diamine unit containing 70 mol % or more of a structural unit derived from m-xylylenediamine, and a dicarboxylic acid unit containing 70 mol % or more of a structural unit derived from a dicarboxylic acid selected from the group consisting of α,ω-linear aliphatic dicarboxylic acid having 4 to 20 carbon atoms and isophthalic acid and having a molar ratio of a structural unit derived from the α,ω-linear aliphatic dicarboxylic acid having 4 to 20 carbon atoms to a structural unit derived from isophthalic acid of 30:70 to 100:0.

3. The container cap according to claim 1, wherein an acid value of the acid-modified polyolefin (B) is more than 15 mgKOH/g and 30 mgKOH/g or less.

4. The container cap according to claim 1, wherein a terminal amino group concentration of the m-xylylene group-containing polyamide (C) is from 10 to 100μ equivalent/g.

5. The container cap according to claim 1, wherein the polyolefin (A) is a polypropylene resin.

6. The container cap according to claim 1, wherein the m-xylylene group-containing polyamide (C) is dispersed in a layered form in a cap top surface portion.

7. The container cap according to claim 1, wherein the molded article is an injection-molded article.

8. A method for producing the container cap according to claim 1, comprising subjecting the resin composition to injection molding to thereby obtain the molded article.

9. The method for producing the container cap according to claim 8, wherein a resin temperature at a nozzle tip of an injection molding machine performing the injection molding falls within a range of −5° C. to +15° C. with respect to a melting point of the m-xylylene group-containing polyamide (C), as measured by DSC.

10. The method for producing the container cap according to claim 8, wherein the resin composition is injected from a cap top surface portion side through a one-point gate.

11. The method for producing the container cap according to claim 10, wherein the one-point gate has a gate diameter of 0.5 to 1.2 mm.

* * * * *